United States Patent
Wolff et al.

(10) Patent No.: US 6,960,545 B2
(45) Date of Patent: Nov. 1, 2005

(54) PREFERABLY PB-FREE AND AS-FREE OPTICAL GLASSES WITH TG≦500° C.

(75) Inventors: Silke Wolff, Hueckeswagen (DE); Ute Woelfel, Mainz (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/725,846

(22) Filed: Dec. 2, 2003

(65) Prior Publication Data
US 2004/0132606 A1 Jul. 8, 2004

(30) Foreign Application Priority Data
Dec. 3, 2002 (DE) .......................... 102 56 629

(51) Int. Cl.$^7$ ............................................... C03C 3/118
(52) U.S. Cl. ........................... 501/59; 501/66; 501/68; 501/902; 501/903
(58) Field of Search ............................ 501/59, 66, 68, 501/902, 903

(56) References Cited

U.S. PATENT DOCUMENTS

| | | | |
|---|---|---|---|
| 2,748,006 A | | 5/1956 | Kreidl et al. |
| 2,920,971 A | | 1/1960 | Stookey |
| 3,529,980 A | | 9/1970 | Bromer et al. |
| 3,630,765 A | | 12/1971 | Araujo |
| 3,764,354 A | * | 10/1973 | Ritz et al. ............... 501/59 |
| 3,981,707 A | * | 9/1976 | Araujo et al. ............ 65/386 |
| 4,149,895 A | | 4/1979 | Boudot et al. |
| 5,145,757 A | | 9/1992 | Smoot et al. |
| 6,255,240 B1 | | 7/2001 | Comte et al. |

FOREIGN PATENT DOCUMENTS

| | | |
|---|---|---|
| DE | 973 350 | 1/1960 |
| DE | 35 34 575 A1 | 4/1986 |
| DE | 42 42 859 A1 | 2/1994 |
| DE | 195 12 847 C1 | 11/1996 |
| DE | 196 50 692 A1 | 6/1998 |
| EP | 0 404 040 A1 | 12/1990 |
| EP | 0 383 873 B1 | 3/1993 |
| EP | 0 658 524 A1 | 6/1995 |
| GB | 1209590 | 10/1970 |
| GB | 2 234 240 A | 1/1991 |
| GB | 2 320 023 A | 6/1998 |
| JP | 01133956 A | 5/1989 |
| JP | 2001-348245 | 12/2001 |
| SU | 1127861 A | 12/1984 |
| WO | 89/09250 | 10/1989 |

\* cited by examiner

Primary Examiner—David Sample
(74) Attorney, Agent, or Firm—Michael J. Striker

(57) ABSTRACT

The present invention relates to preferably lead-free and arsenic-free optical glasses, having a refractive index of $1.48 \leq n_d \leq 1.56$, an Abbe number of $64 \leq vd \leq 72$, a low transformation temperature ($Tg \leq 500°$ C.) and good ion exchange properties, as well as good chemical resistance and crystallization stability, and comprising the following composition (in % by weight):

| | |
|---|---|
| $SiO_2$ | 53–58 |
| $B_2O_3$ | 11–15 |
| $Al_2O_3$ | 16–20 |
| $Na_2O$ | 0–13 |
| $K_2O$ | 0–13 |
| $\Sigma M_2O$ | 9–13 |
| F | 0.5–4 |

The glass may additionally contain standard refining agents. The invention also relates to the use of the optical glasses according to the invention in the application areas of imaging, projection, telecommunications, optical communication technology and/or laser technology.

8 Claims, No Drawings

PREFERABLY PB-FREE AND AS-FREE OPTICAL GLASSES WITH TG≦500° C.

The present invention relates to preferably lead-free and arsenic-free optical glasses, having a refractive index of $1.48 \leq n_d \leq 1.56$, an Abbe number of $64 \leq v_d \leq 72$, a low transformation temperature (Tg≦500° C.) and good ion exchange properties, as well as good chemical resistance and crystallization stability, and the use of such glasses.

In recent years, in both optical and opto-electronic technologies (application areas including imaging, projection, telecommunications, optical communication technology and laser technology), there has been a considerable market trend towards miniaturization. This is apparent from the ever decreasing size of end products and of course requires increasing miniaturization of the individual modules and components of end projects of this type. For producers of optical glasses, this trend, despite increasing numbers of end products, entails a considerable drop in volume demand for raw glass. At the same time, the further processors are putting increasing pressure on glass manufacturers' prices, since the production of smaller components of this type from block glass and/or draw rod glass in percentage terms, based on the product, entails significantly increased scrap, and the machining of extremely small parts of this nature entails higher costs than larger components.

As an alternative to separating optical components out of block glass or draw rod glass, as has hitherto been customary, production processes in which as far as possible direct pressed bodies, i.e. blank-pressed optical components, and/or preforms which are as near net shape as possible for repressing, known as "precision gobs", can be obtained directly from the glass melt have thus been experiencing an upsurge in recent times. Precision gobs are generally understood as meaning preferably completely fire polished, semi-free or free formed glass portions which are accessible via various production processes.

One method for producing precision gobs is the bead spraying process, in which glass beads with a defined size distribution are produced from the glass melt by means of a spraying process. The desired size fraction(s) is/are separated off, for example, by screening. The residual fraction does not have to be discarded, but rather can be recycled as high-purity cullet which can be melted down again particularly well. This process, which is very simple to carry out in terms of technology and labour requirements and does not require targeted portioning of the glass strand, allows large numbers to be produced within a short time.

However, the process of near net shape direct pressing, which is higher up in the value added chain, known as blank pressing, is more advantageous. This process allows the smaller volumes of glass melt (distributed over a large number of small pieces of material) to be flexibly counteracted by means of short set-up times. However, compared to gob spraying, on account of the reduced number of cycles and pieces, with small geometries, the added value cannot be derived from the value of the material alone. Therefore, the products have to leave the press in a state which is "ready for system installation", i.e. it must be possible to dispense with expensive remachining, cooling and/or further processing in the cold state. On account of the highly accurate geometries required, precision equipment with high-quality and therefore expensive mould materials have to be used for a pressing process of this type. The service lives of these moulds are a huge factor in the profitability of the products and/or materials produced. An extremely important factor with regard to achieving a long service life is that the operating temperature be as low as possible, but this operating temperature can only be reduced to an extent which still ensures that the viscosity of the materials which are to be pressed remains sufficient for the pressing operation. Therefore, there is a direct causal link between the processing temperature and therefore the transformation temperature Tg of a glass which is to be processed and the profitability of a pressing operation of this type: the lower the transformation temperature of the glass, the longer the mould service lives become and the greater the profit margin. This relationship therefore results in the need for what are known as "low-Tg glasses", that is to say glasses with low melting and transformation points, i.e. glasses which have a viscosity which is sufficiently low for them to be worked at the lowest possible temperatures.

Recently, an increased demand for "short" glasses has been reported as a further customer criterion with regard to the melt process technology, that is to say a demand for glasses whose viscosity varies considerably with a relatively slight change in the temperature. In the melting process, this behaviour has the advantage that the hot-shaping times, i.e. the mould closure times, can be reduced. This firstly increases the throughput, i.e. reduces the cycle time, and secondly is also more gentle on the mould material, which, as has been described above, also has a positive effect on the overall production costs. Short glasses of this type have the further advantage that on account of the more rapid cooling than with corresponding longer glasses it is also possible for glasses with a stronger tendency to crystallize to be worked. This avoids the need for preliminary nucleation, which could cause problems in subsequent secondary hot-shaping steps.

This opens up the possibility of also enabling glasses of this type to be drawn into fibres.

The particular demands imposed by the new range of products from the telecommunications and optical communication technology sectors further require new glasses also simultaneously to be suitable for ion exchange processes. Unlike previously, when ion exchange of this nature was used primarily to toughen and/or harden a glass, in the new technologies the ion exchange is to be used as a low-stress or even stress-free structuring technique. By way of example, it is in this way possible to produce waveguide elements, gradient index lenses and similar optical elements which are to have a refractive index which gradually changes as a function of location. For ion exchange, the lowest possible transformation temperature Tg is also favourable, since the process temperatures involved in the ion exchange can then be kept well below the crystallization limits of the glass.

Although the composition range of the glasses according to the present invention does not initially appear unusual, the prior art scarcely mentions glasses in this field, let alone optical glasses. Instead, it has described on the one hand materials such as enamels, ceramics and/or glass-ceramic. Furthermore, there are some photochromic glasses and glass-ceramics which are (dis)coloured when light is radiated into them. However, neither crystallization nor discolouration resulting from radiation of light can be accepted for the production of optically high-quality glasses in the desired application areas. Examples which may be mentioned include the following documents:

| | |
|---|---|
| SU 1 127 861 | Fast-fireable enamels for cookware |
| U.S. Pat. No. 2,920,971 | Glass-ceramic with at least 50% crystal phase |
| U.S. Pat. No. 3,630,765 | Photochromic glass for fibre-optics |
| DE 19 512 847 | PbO-free and CdO-free glass for glazes, enamels and decors |
| WO 89/09250 | Fluorescent pigments |
| GB 22 34 240 | Glass frit for enamelled sanitaryware and wall panels |
| EP 0 383 873 | Al—F silicate glass for glass ionomer cement in dental medicine |

In the light of these publications, it is extremely surprising that a crystallization-stable composition range for optical glasses was found right in the middle of this densely populated ceramic field, and that this composition range moreover has numerous further advantages, such as a capacity for ion exchange, a suitability for precision hot-shaping, etc., with regard to the desired applications.

The prior art also describes the following glasses with a similar optical position or comparable chemical composition, which, however, have significant drawbacks.

The UV-absorbing glass polarizers described in EP 0 658 524 (Corning) consist of a glass which must contain the components Cu(I) oxide ($\geq 0.2\%$ by weight) and Sn(II) oxide ($\geq 0.4\%$ by weight). These bring about drawbacks in the glass properties for the applications which are desired in accordance with the invention. On account of the oxidizing conditions of a conventional glass melt, Cu(I) oxide reacts to form Cu(II) oxide, a colouring component which has adverse effects even in small quantities (>0.2% by weight). Although the loss in transmission at the blue spectral edge produced in this way may still be acceptable for standard optical applications, it prevents glasses of this type from being used for the new high-performance technologies. Moreover, even the small amount of Sn(II) oxide has an adverse effect on the crystallization stability of the glass. An additional difficulty is that Sn(II) in the melt is not completely converted into Sn(IV), but rather remains partially in reduced form in the glass, where, as a polyvalent component, it makes ion exchange with silver ions impossible. The Ag(I) would be reduced to elemental Ag(0) by the oxidation of the Sn(II) to form Sn(IV) and would then act as a transmission-reducing phototropic component. Also, the desired local change in refractive index could not then be achieved.

U.S. Pat. No. 2,748,006 (Bausch & Lomb Optical) describes a borosilicate glass for the production of sunglasses. Since sunglasses are by their very nature shaded, in this case too the blue transmission edge is "broken", i.e. shifted too far into the longer wavelengths for the desired applications, by means of colouring components ($Fe_2O_3$, $Co_3O_4$). Moreover, the material has to contain at least 1% by weight of ZnO, which has an adverse effect on the crystallization stability of the glass during melting and hot-shaping, in particular if particularly high process temperatures are used in order to prevent the introduction of platinum and therefore to ensure a very high absolute transmission. Furthermore, it can be seen from the components which are added that these glasses are melted under reducing conditions (use of Si and/or C). However, a melting process of this type is extremely difficult to implement reproducibly, in particular if the quality and therefore reproduction scales of the new technologies are applied. This is especially true since the process leads to a high level of platinum being introduced into the glass and, in continuous refractory appliances, to very high levels of refractory material being removed, so that the service lives of the appliances are shortened to a disproportionate degree. This would make the glasses according to the invention far more expensive than necessary.

DE 973 350 (Schott) describes a silicate glass with a low refractive index and a high dispersion. The glass, unlike the present invention, contains total alkali metal oxide and aluminium oxide contents of more than 35% by weight. Furthermore, this material contains up to 30% by weight of $TiO_2$, with the result that the crystallization stability of the material, both with regard to the melt and primary hot-shaping, in particular precision hot-shaping, and with regard to a potential secondary hot-shaping step, such as pressing, ion exchange, cooling, countersinking, etc. is reduced to an unacceptable degree. However, $TiO_2$ is an indispensable component in the glasses mentioned, since this document seeks to achieve a completely different optical position from the glasses according to the invention. The glasses according to the invention likewise have a low refractive index, but at a low dispersion rather than at a high dispersion.

JP 01-133 956 (Canon) discloses glasses for lenses with a gradient in the refractive index. However, the glasses have to contain up to 15.7% by weight of $Li_2O$, $Cs_2O$ or $Tl_2O$, which are not provided in accordance with the present invention; $Li_2O$ greatly reduces the crystallization stability of a glass. The same is true of the $Li_2O$—SrO alumino silicate glasses which are described in JP 2001-348245 (Hoya) and can be used as toughenable television glass. The obligatory contents of up to 12.4% by weight of $Li_2O$ and 29.2% by weight of SrO reduced the crystallization stability excessively. Furthermore, lithium oxide for optical high-performance glasses would have to be used in the form of high-purity $Li_2O$, which would make the glasses more expensive.

EP 0 404 040 (Schott) describes glasses for an optical recording medium. These glasses always contain alkaline-earth metals, which is disadvantageous for the glasses according to the invention. Furthermore, the glasses according to the invention do not contain any chlorine.

Therefore, the object of the present invention is to provide PbO-free and $As_2O_3$-free optical glasses which should be as short as possible, should have a particularly low transformation temperature Tg and furthermore should have the desired optical properties ($n_d/v_d$). Moreover, the possibility of ion exchange reactions should optionally be present.

The above object is achieved by the embodiments of the present invention which are described in the claims.

In particular, the present invention relates to an optical glass having a refractive index $n_d$ of $1.48 \leq n_d \leq 1.56$, an Abbe number $v_d$ of $64 \leq v_d \leq 72$ and a transformation temperature $Tg \leq 500°$ C., which comprises the following composition (in % by weight):

| | |
|---|---|
| $SiO_2$ | 53–58 |
| $B_2O_3$ | 11–15 |
| $Al_2O_3$ | 16–20 |
| $Na_2O$ | 0–13 |
| $K_2O$ | 0–13 |
| $\Sigma M_2O$ | 9–13 |
| F | 0.5–4 |

According to the invention, the term "substantially free" of a component means that a compound of this type is not deliberately added to the glass composition as a component, but rather a component of this type is introduced into the glass at most as an impurity in trace amounts resulting from the starting materials or from the melting and/or working processes.

The glasses according to the invention are distinguished by an optical position in the region of the Fluor Crown, borosilicate, phosphate crown and phosphate dense crown glasses. In particular, they have a refractive index $n_d$ of $1.48 \leq n_d \leq 1.56$, preferably $1.49 \leq n_d \leq 1.54$, combined, at the same time, with an Abbe number $v_d$ of $64 \leq v_d \leq 72$, preferably of $65 \leq v_d \leq 70$.

The transformation temperature Tg is very low, at Tg$\leq$500° C., preferably Tg$\leq$480° C., even more preferably Tg$\leq$460° C. Furthermore, all the glasses according to the invention are what are known as "short glasses", i.e. glasses whose viscosity drops relatively quickly as the temperature falls or rises relatively quickly as the temperature increases.

Furthermore, all the glasses according to the invention have a good chemical resistance and stability to crystallization or crystallization stability. They are furthermore distinguished by good melting properties and flexible, near net shape working properties, low production costs on account of reduced process costs, good ion exchange properties, and by a good environmental compatibility.

The glasses according to the invention resulted in the optical position, viscosity temperature profile and working temperatures being set in such a manner that a highly specified near net shape hot-shaping is ensured even using sensitive precision machinery. Moreover, a correlation between crystallization stability and viscosity temperature profile was achieved, so that further heat treatment, such as pressing, or repressing or ion exchange processes, of the glasses is readily possible.

The basic glass system of the glass according to the invention is the aluminoborosilicate glass system, which is an inherently very stable system characterized by a high glass former content. As a result, it acquires crystallization stability, both in the melt and during primary hot-shaping, as well as in potential secondary hot-shaping steps, such as pressing, toughening, cooling, ion exchange, etc.

The glass according to the invention contains from 53 to 58% by weight, preferably 53–56% by weight, of $SiO_2$ as the main component. Increasing the $SiO_2$ content beyond 58% by weight would lead to an excessively high absolute viscosity with an excessively great length of the material, which would make it unsuitable for the desired form of the precision hot-shaping. Dropping below the lower limit of 53% by weight would lead to an insufficient crystallization stability and result in the chemical resistance of the glasses being too low.

$Al_2O_3$ is present in the glass according to the invention in amounts of from 16 to 20% by weight, preferably 16 to 18% by weight, as the second main component. The addition of these levels of $Al_2O_3$ serves primarily to increase the chemical resistance without increasing the viscosity of the glass to the same extent as if more $SiO_2$ were added. Nevertheless, increasing the $Al_2O_3$ content to beyond 20% by weight would excessively increase the viscosity. If the $Al_2O_3$ content were to drop below the lower limit of 16% by weight, it would be impossible for the glasses to achieve a sufficient chemical resistance or stability. Moreover, an $Al_2O_3$ content within the limits indicated is also necessary in order to widen the borosilicate structure of the material by means of tube structures caused by $Al_2O_3$ and thereby to create the required conditions for effective diffusion processes and therefore ion exchange processes.

The glass according to the invention contains from 11 to 15% by weight of $B_2O_3$. This component serves as a third glass former to stabilize the network against crystallization while at the same time advantageously reducing the absolute viscosity and making the glass "shorter". Further increasing the $B_2O_3$ content to beyond 15% by weight would lower the chemical resistance and at the same time increase the corrosion of refractory materials. This would unnecessarily reduce the service lives of the equipment, which in turn would drastically increase the production costs of the material. A $B_2O_3$ content which is too low, below 11% by weight, would not sufficiently reduce the viscosity of the glass to enable it to be used efficiently for precision hot-shaping.

The glass according to the invention also contains alkali metal oxides in a total amount of at least 9% by weight, preferably at least 11% by weight, while an upper limit of at most 13% by weight should not be exceeded. Alkali metal oxides of this nature on the one hand constitute a further way of adjusting the viscosity temperature profiles and the optical position of the glasses with a very high level of accuracy, but on the other hand, it is only the presence of Na and K ions in the glass which actually allow subsequent ion exchange. Total alkali metal oxide contents of less than 9% by weight would result in an insufficient ion exchange potential, which in turn would lead to significantly inadequate refractive index gradients in the exchanged glasses. Alkali metal oxide contents of over 13% by weight would cause the absolute viscosity to be too low and would therefore increase the tendency to crystallization and have an adverse effect on the chemical resistance.

$Na_2O$ and $K_2O$ are the preferred alkali metal oxides.

The glass according to the invention contains at most 13% by weight of $Na_2O$, preferably from 9 to 13% by weight, particularly preferably from 11 to 13% by weight, of $Na_2O$. The $K_2O$ content is preferably also at most 13% by weight, and is preferably 10% by weight, particularly preferably 8% by weight.

$Na_2O$ is preferentially used over $K_2O$, since firstly in this glass matrix it has significantly higher diffusion coefficients and therefore better exchange properties, and secondly it reduces the viscosity to a greater extent even when it is present in smaller amounts. Therefore, such $Na_2O$-containing glasses which are substantially free of $K_2O$ are significantly easier to feed for precision hot-shaping, since the viscosity temperature profiles can be set more effectively.

The glass preferably does not contain any $Li_2O$. Although $Li_2O$ would be approximately equally suitable as $K_2O$ or $Na_2O$ for acting as a flux, an $Li_2O$-containing glass does not have any potential for subsequent ion exchange with silver ions, since the difference in the size ratios between $Li^+$ and $Ag^+$, and also between $Li^+$ and $K^+$, is too great for effective exchange times and quantities. Secondly, it would have a significant adverse effect on the crystallization stability of the glasses. In addition, $Li_2O$ in combination with $B_2O_3$ allows the chemical behaviour of the glasses in the melting process to become very aggressive, so that high levels of refractory corrosion are observed. The repair processes which this entails mean that the equipment service lives are drastically reduced and the product price is increased.

The glass according to the invention also contains fluorine as an obligatory component. Fluorine is present in the glass according to the invention in an amount of from 0.5 to 4% by weight. In the glass according to the invention, this component constitutes a sensitive control variable. It offers the option both of very fine adjustment of the optical position and of fine tuning of the viscosity temperature profiles. Moreover, fluorine in this glass system serves to shorten the glasses. As an additional aspect, adding fluorine has an advantageous effect on the speed of ion diffusion in the ion exchange process, specifically both during the primary exchange process and when the ion-exchanged products are considered in the long term. Reducing the fluorine content to below 0.5% by weight would lead to an excessively high refractive index with an excessively high dispersion, and also (on account of reduced diffusion coefficients) to uneconomical process times in ion exchange processes. Increasing the fluorine content to over 4% by weight would firstly lead to excessively low refractive indices and secondly would lead to excessively high diffusion coefficients, which—in addition to producing uncontrollably short process times—has an adverse effect on the long-term stability of the refractive index profiles in the exchanged products. In this context, it is possible to speak of subsequent diffusion during the service life of the product. In addition, higher fluorine contents in glasses inevitably entail the need for safety measures in melting, which have a highly adverse effect on production capability in conventional standard equipment and therefore on the production prices of the glasses.

The glass according to the invention is preferably substantially free of alkaline-earth metal compounds, in particular if the glass is to be available for ion exchange applications. Alkaline-earth metal compounds lead to the formation of a barrier layer preventing ion exchange, thereby preventing ion exchange from taking place.

Furthermore, for environmental reasons the glass according to the invention is preferably substantially free of lead.

In addition, the glass according to the invention may also contain standard refining agents, preferably one or more of the following components (in % by weight):

| | | |
|---|---|---|
| $Sb_2O_3$ | 0–1 | and/or |
| SnO | 0–1 | and/or |
| NaCl | 0–1 | and/or |
| $SO_4^{2-}$ | 0–1 | |

It is preferable for the refining agents used not to be arsenic compounds, and the glass according to the invention is preferably substantially arsenic-free. Furthermore, polyvalent refining agents, such as $Sb_2O_3$, or SnO are not preferred when the glass is planned to be used for ion exchange processes with silver ions. In such a case, the glass is preferably substantially free of polyvalent cations. Fluorine is generally not used as a refining agent in the glass according to the invention.

The present invention also relates to the use of the glasses according to the invention for an optical element in the application areas of imaging, projection, telecommunications, optical communication technology and/or laser technology.

The present invention is explained in more detail below on the basis of a number of examples. However, the present invention is not restricted to the examples mentioned.

EXAMPLES

The glasses according to the invention were produced as follows:

The raw materials for the oxides, preferably carbonates, nitrates and fluorides, are weighed out, one or more refining agents, such as for example $Sb_2O_3$ are added, and then thorough mixing takes place. The glass batch is melted at approx. 1300° C. in a continuous melting unit and is then refined (1350° C.) and homogenized. The glass is either cast and worked into the desired dimensions at a casting temperature of approximately 1220° C., or fed for precision hot-shaping at lower temperatures (<800° C.).

TABLE 1

Melting example for 100 kg of glass (calculated)

| Oxide | % by weight | Raw material | weighed-in quantity (kg) |
|---|---|---|---|
| $SiO_2$ | 56 | $SiO_2$ | 56.05 |
| $B_2O_3$ | 12 | $H_3BO_3$ | 21.24 |
| $Al_2O_3$ | 17 | AlO(OH) | 21.83 |
| $Na_2O$ | 12 | $Na_2CO_3$ | 12.39 |
| F | 3 | NaF | 6.49 |
| Total | 100 | | 118.00 |

The properties of the glass obtained by melting these components are given as Example 3 in Table 2.

Tables 2 and 3 include 14 exemplary embodiments within the composition range according to the invention. The contents by weight of the components in Tables 2 and 3 are calculated from analysis data of the glasses.

It can be seen from the examples that similar compositions, which differ only in terms of the amount and nature of the alkali metal oxides used, have a significantly higher Tg when $K_2O$ is present instead of $Na_2O$.

Ion exchange tests with a silver nitrate melt at a temperature of approximately Tg-40° C. were carried out on the glasses of Examples 1 to 14 produced in this way. In all the glasses, a change in the refractive index brought about by the ion exchange was observed. Crystallization of the glass did not occur in any of the cases.

TABLE 2

Melting examples (in % by weight)

| | Example 1 | Example 2 | Example 3 | Example 4 | Example 5 | Example 6 | Example 7 |
|---|---|---|---|---|---|---|---|
| $SiO_2$ | 53 | 55 | 56 | 58 | 53 | 58 | 57 |
| $B_2O_3$ | 15 | 14 | 12 | 11 | 15 | 11 | 13 |
| $Al_2O_3$ | 16 | 18 | 17 | 16 | 20 | 20 | 19 |
| $Na_2O$ | 13 | 11 | 12 | 11 | 11.5 | 9 | 10 |
| $K_2O$ | | | | | | | |
| F | 3 | 2 | 3 | 4 | 0.5 | 2 | 1 |
| $Sb_2O_3$ | 0.3 | | | 0.3 | | 0.3 | |
| Total | 100.3 | 100.0 | 100.0 | 100.3 | 100.0 | 100.3 | 100.0 |

TABLE 2-continued

Melting examples (in % by weight)

| | Example 1 | Example 2 | Example 3 | Example 4 | Example 5 | Example 6 | Example 7 |
|---|---|---|---|---|---|---|---|
| $n_d$ | 1.5074 | 1.5287 | 1.5054 | 1.4837 | 1.5618 | 1.5273 | 1.5496 |
| $v_d$ | 66.68 | 68.73 | 66.63 | 64.66 | 71.55 | 68.73 | 70.70 |
| $P_{g,F}$ | 0.5473 | 0.5543 | 0.5473 | 0.5473 | 0.5683 | 0.5543 | 0.5623 |
| $\Delta P_{g,F}(10^{-4})$ | −0.0039 | −0.0028 | −0.0039 | −0.0051 | −0.0010 | −0.0028 | −0.0017 |
| $\alpha_{20-300}(10^{-6} * K^{-1})$ | 7.9 | 7.4 | 7.7 | 7.3 | 7.6 | 6.9 | 7.2 |
| $\rho(g/cm^3)$ | 2.33 | 2.39 | 2.35 | 2.32 | 2.45 | 2.42 | 2.44 |
| $T_g(°C)$ | 429 | 450 | 436 | 439 | 452 | 463 | 465 |

TABLE 3

Melting examples (in % by weight)

| | Example 8 | Example 9 | Example 10 | Example 11 | Example 12 | Example 13 | Example 14 |
|---|---|---|---|---|---|---|---|
| $SiO_2$ | 53.0 | 55.0 | 56.0 | 58.0 | 53.0 | 58.0 | 57.0 |
| $B_2O_3$ | 15.0 | 14.0 | 12.0 | 11.0 | 15.0 | 11.0 | 13.0 |
| $Al_2O_3$ | 16.0 | 18.0 | 17.0 | 16.0 | 20.0 | 20.0 | 19.0 |
| $Na_2O$ | 7.0 | 9.0 | 8.0 | 3.0 | 4.5 | 4.0 | |
| $K_2O$ | 6.0 | 2.0 | 4.0 | 8.0 | 7.0 | 5.0 | 10.0 |
| F | 3.0 | 2.0 | 3.0 | 4.0 | 0.5 | 2.0 | 1.0 |
| $Sb_2O_3$ | | | 0.3 | 0.3 | | | 0.3 |
| Total | 100.0 | 100.0 | 100.3 | 100.3 | 100.0 | 100.0 | 100.3 |
| $n_d$ | 1.5070 | 1.5286 | 1.5051 | 1.4829 | 1.5620 | 1.5271 | 1.5497 |
| $v_d$ | 66.70 | 68.74 | 66.64 | 64.65 | 71.64 | 68.76 | 70.81 |
| $P_{g,F}$ | 0.5463 | 0.5543 | 0.5473 | 0.5373 | 0.5673 | 0.5543 | 0.5613 |
| $\Delta P_{g,F}(10^{-4})$ | −0.0039 | −0.0028 | −0.0039 | −0.0052 | −0.0010 | −0.0028 | −0.0018 |
| $\alpha_{20-300}(10^{-6} * K^{-1})$ | 7.6 | 7.3 | 7.5 | 7.0 | 7.3 | 6.6 | 6.7 |
| $\rho(g/cm^3)$ | 2.33 | 2.39 | 2.36 | 2.32 | 2.46 | 2.43 | 2.44 |
| $T_g(°C)$ | 446 | 455 | 447 | 462 | 473 | 478 | 494 |

We claim:

1. Optical glass having a refractive index $n_d$ of $1.48 \leq n_d \leq 1.56$, an Abbe number $v_d$ of $64 \leq v_d \leq 72$ and a transformation temperature $T_g \leq 500°$ C., which comprises the following composition (in % by weight):

| | |
|---|---|
| $SiO_2$ | 53–58 |
| $B_2O_3$ | 11–15 |
| $Al_2O_3$ | 16–20 |
| $Na_2O$ | 0–13 |
| $K_2O$ | 0–13 |
| $\Sigma M_2O$ | 9–13 |
| F | 0.5–4. |

2. Optical glass according to claim 1, which comprises the following composition (in % by weight):

| | |
|---|---|
| $SiO_2$ | 53–58 |
| $B_2O_3$ | 11–15 |
| $Al_2O_3$ | 16–20 |
| $Na_2O$ | 9–13 |
| F | 0.5–4. |

3. Optical glass according to claim 1 or 2, which comprises the following composition (in % by weight):

| | |
|---|---|
| $SiO_2$ | 53–56 |
| $B_2O_3$ | 11–15 |
| $Al_2O_3$ | 16–18 |
| $Na_2O$ | 11–13 |
| F | 0.5–4. |

4. Optical glass according to claim 1, which as refining agents contains the following components (in % by weight):

| | | |
|---|---|---|
| $Sb_2O_3$ | 0–1 | and/or |
| SnO | 0–1 | and/or |
| NaCl | 0–1 | and/or |
| $SO_4^{2-}$ | 0–1. | |

5. Optical glass according to claim 1, which is substantially free of lead.

6. Optical glass according to claim 1, which is substantially free of arsenic.

7. An optical element consisting of the optical glass of claim 1.

8. Optical glass having a refractive Index $n_d$ of $1.48 \leq n_d \leq 1.56$, an Abbe number $v_d$ of $64 \leq v_d \leq 72$ and a transformatIon temperature $T_g \leq 500°$ C, which comprises the following composition (in % by weight):

| | |
|---|---|
| $SiO_2$ | 53–58 |
| $B_2O_3$ | 11–15 |
| $Al_2O_3$ | 16–20 |
| $Na_2O$ | 0–13 |
| $K_2O$ | 0–13 |
| $\Sigma M_2O$ | 9–13 |
| F | 0.5–4 |
| $Sb_2O_3$ | 0–1. |

* * * * *